(12) United States Patent
Erdmann et al.

(10) Patent No.: US 8,908,513 B2
(45) Date of Patent: Dec. 9, 2014

(54) METHOD FOR COMMUNICATING IN A NETWORK COMPRISING A BATTERYLESS ZIGBEE DEVICE, NETWORK AND DEVICE THEREFOR

(75) Inventors: Bozena Erdmann, Eindhoven (NL); Armand Michel Marie Lelkens, Eindhoven (NL); Willem Franke Pasveer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 256 days.

(21) Appl. No.: 13/201,294

(22) PCT Filed: Feb. 10, 2010

(86) PCT No.: PCT/IB2010/050606
§ 371 (c)(1),
(2), (4) Date: Aug. 12, 2011

(87) PCT Pub. No.: WO2010/092532
PCT Pub. Date: Aug. 19, 2010

(65) Prior Publication Data
US 2011/0299451 A1    Dec. 8, 2011

(30) Foreign Application Priority Data
Feb. 13, 2009 (EP) .................................. 09305141

(51) Int. Cl.
| | | |
|---|---|---|
| G01R 31/08 | (2006.01) | |
| H04W 40/02 | (2009.01) | |
| H04L 12/721 | (2013.01) | |
| H04L 12/841 | (2013.01) | |
| H04L 12/801 | (2013.01) | |
| H04L 12/701 | (2013.01) | |
| H04W 40/12 | (2009.01) | |
| H04W 24/00 | (2009.01) | |
| H04W 72/12 | (2009.01) | |
| H04L 12/26 | (2006.01) | |
| H04W 84/18 | (2009.01) | |

(52) U.S. Cl.
CPC .............. *H04W 40/02* (2013.01); *H04W 40/12* (2013.01); *H04W 24/00* (2013.01); *H04L 45/44* (2013.01); *H04L 47/283* (2013.01); *H04L 45/32* (2013.01); *H04W 72/1205* (2013.01); *H04L 43/087* (2013.01); *H04W 84/18* (2013.01); *H04L 47/14* (2013.01); *H04L 45/123* (2013.01); *H04L 45/00* (2013.01)
USPC ......... 370/230.1; 370/238; 370/328; 370/351

(58) Field of Classification Search
CPC ..... H04W 84/18; H04W 56/00; H04W 40/10; H04W 40/005; H04W 40/22
See application file for complete search history.

(56) References Cited

U.S. PATENT DOCUMENTS

| | | |
|---|---|---|
| 2004/0165532 A1 | 8/2004 | Poor |
| 2005/0180399 A1* | 8/2005 | Park et al. ..................... 370/352 |

(Continued)

*Primary Examiner* — Jung Park
(74) *Attorney, Agent, or Firm* — Larry Liberchuk

(57) ABSTRACT

The present invention relates to a method for wireless communication in a network comprising a resource-restricted end device (ZBLD), and at least one router device (R5), wherein the method comprises the following steps: the end device (ZBLD) transmitting a data frame to be forwarded to a destination device in the network,—the router device (R5) receiving the data frame, the router device associating a delay to the data frame and scheduling transmission of the frame after this delay, in case the router device listening that the data frame has been forwarded by another router device, cancelling the scheduled transmission of the data frame. The invention also relates to a router device and a network therefor.

11 Claims, 1 Drawing Sheet

(56) References Cited

U.S. PATENT DOCUMENTS

| | | |
|---|---|---|
| 2006/0120371 A1 | 6/2006 | Huang |
| 2006/0187961 A1* | 8/2006 | Kai .............................. 370/469 |
| 2008/0075005 A1* | 3/2008 | Kim et al. ..................... 370/230 |
| 2008/0075009 A1* | 3/2008 | Picard .......................... 370/238 |
| 2009/0046622 A1 | 2/2009 | Hua |
| 2010/0110888 A1* | 5/2010 | Park et al. ..................... 370/230 |
| 2010/0271945 A1* | 10/2010 | Clave et al. ................. 370/230.1 |
| 2010/0306748 A1* | 12/2010 | Erdmann et al. .............. 717/140 |

* cited by examiner

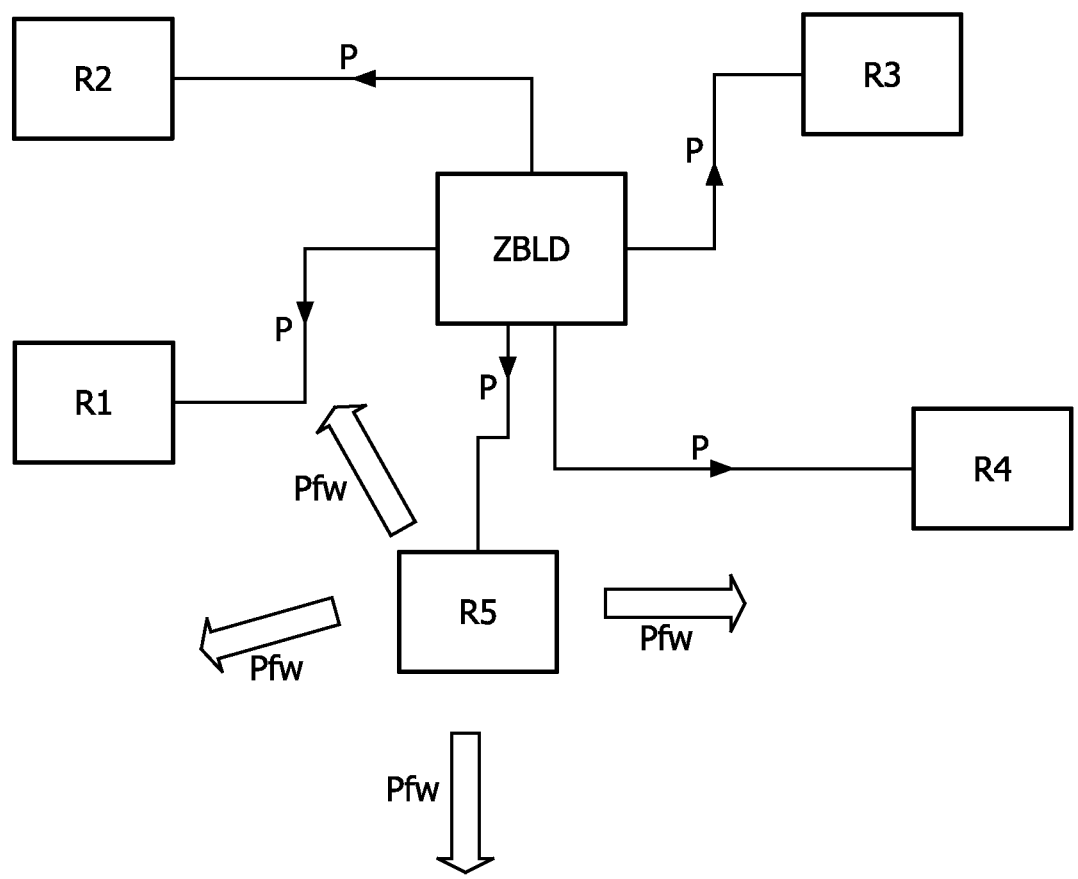

METHOD FOR COMMUNICATING IN A NETWORK COMPRISING A BATTERYLESS ZIGBEE DEVICE, NETWORK AND DEVICE THEREFOR

FIELD OF THE INVENTION

The present invention relates to a method for communicating in a wireless control network. More particularly, the present invention relates to a method for ensuring maintaining a communication link between a communication device and a router in a wireless network.

This invention is, for example, relevant for wireless networks comprising resource-restricted devices having low power resources. In a specific application, the present invention is relevant for wireless networks using communication protocols compliant with the IEEE802.15.4 and also IEEE802.15.4-based protocols, e.g. ZigBee protocol.

BACKGROUND OF THE INVENTION

Wireless control networks have recently become a ubiquitous trend in the field of communication, especially for building management systems. Wireless technologies present major advantages in terms of freedom of device placement, device portability, and installation cost reduction, since there is no need for drawing cables and drilling. Thus, such technologies are particularly attractive for interconnecting, detecting, automation, control or monitoring systems using sensor devices such as light switches, light dimmers, wireless remote controllers, movement or light detectors, that have to be set up in distant places one from the other and from the devices they control, e.g. lights.

One of the drawbacks appearing in networks of the like relates to device powering. Indeed, since the devices are not wired, they can not anymore receive power necessary for performing all the operations required in the network from the mains or via the connection with the controller. Thus, it has been envisaged to equip such devices with built-in batteries. However, since the devices are quite size-constrained, batteries may not be of a large size, which results either in a reduced device lifetime, or in labour intensive battery replacement.

It has been suggested to remedy this issue by equipping sensor devices with self-sustained energy sources that harvest energy from its environment. Still, the amount of energy achievable by off-the-shelf energy harvesters is very limited, which means that the features and functions of the batteryless devices are heavily restricted.

Among the functions that are mandatory to be maintained for good operation in a wireless network is the link connection, which makes it possible to ensure at any time that a resource restricted device is linked to a router which forwards messages on its behalf. In existing implementations therefore, a parent-child relationship is established between an end device, generally resource-restricted, and its parent router. The child end device addresses all its communication to the parent for being forwarded to their final destination. However, in case of energy-harvesting device, this relationship creates a single point of failure in the network, because if the parent link is broken, communication from the end device can not be successfully performed anymore. Moreover, in most cases, such a parent link failure may not even be detected by the end device, due to non-existent or not used receiving circuit on the resource-restricted device, or insufficient energy to wait for and receive the feedback. Indeed, since the end device has very limited resources, it can not perform a complete search in order to find a new parent router when the communication is lost, thus operation in the network is compromised, as well as the operation of the end device from the user's perspective.

So as to remedy the issue of single point of failure created by the parent link of resource-restricted devices, solutions have been proposed using MAC-level broadcast communication. In such methods, a source device only transmits data, without tracking whether it gets forwarded by its neighbours, and without expecting any acknowledgment. On the higher layers, forwarding is taken care of, while also the potential duplicates may be filtered out or prevented by additional mechanisms. The reliability is thus achieved by allowing several nodes, with different propagation conditions, to receive and, if required, forward the frame. One of such higher layer mechanisms is 802.15.4/ZigBee network-level multicast communication: each node within a given range receives the message, and each group member forwards it, once or several times. Another such higher layer mechanism is 802.15.4/ZigBee network-layer broadcast. However, its reliability is based on passive acknowledgement mechanism which requires the originator, as well as any other forwarding node, to track whether its neighbours forward the message and re-try it, if some didn't.

Both mechanisms imply high energy consumption, e.g resulting from response tracking and/or the possible retries that can not be supported by end devices. Furthermore, the usage of broadcast/multicast results in high bandwidth consumption, due to multiple devices in a given neighbourhood re-transmitting several times, which may again lead to network overload and as a consequence, in reduced reliability or temporary failure from a user point of view.

SUMMARY OF THE INVENTION

It is thus an object of the invention to propose a method that allows maintaining correct communications between a resource-restricted device and a wireless network, without creating single point of failure and without involving too much power spending by a resource-constrained device originating a communication, for example a battery-less device.

It is also an object of the invention to propose a method for communicating in a network that reduces the involvement of the end device as much as possible.

Still another object of the present invention is to propose a method that allows decreasing the bandwidth consumption as compared with existing reliable communication methods using broadcast and multicast, while allowing the end device to take advantage of the multiple available proxy-capable devices in its vicinity.

Another aspect of the invention relates to a router device for being used in a network carrying out a method according to the invention, as well as such a network.

In this view, the invention provides a method for wireless communication in a network comprising a resource-restricted end device, and at least one router device, wherein the method comprises the following steps:

the end device transmitting a data frame to be forwarded to a destination device in the network, the router device receiving the data frame, the router device associating a delay to the data frame and scheduling transmission of the frame after this delay, and in case the router device listening that the data frame has been forwarded by another router device, cancelling the scheduled transmission of the data frame.

Thus, a method according to the invention is such that the end device does not need to be pre-configured with the identity of the proxies, neither does it have to track them. Additionally; the proxies do not need to be pre-configured either.

A resource-restricted device, also called end device, within the meaning of the present invention, relates to a communicating device that is restricted at least in terms of energy-resources, acting as a reduced functionality device in the network. Such a method makes it possible for an end device to communicate in a network without any need for the end device to be pre-configured with or discover the identity of the proxy, since the end device transmits a frame to be forwarded without having to know the identity of the router device that will handle the transmission. Furthermore, this method allows the proxy to assume its responsibility without earlier pre-configuration with the end device's identifier. Thus, sending the data frame is the only action performed by the end device, which means that power consumption is reduced to a minimum.

This method also solves the previously mentioned issue of non-detected failure in the network, since router devices are not pre-assigned in advance but assigned on the fly in an ad-hoc manner.

In one embodiment of the invention, the delay associated to a data frame when scheduling transmission is determined, at least partly, in a random manner. In other embodiments, the delay is determined by taking into account other parameter such as: the total path cost, or link cost, of the transmission to the destination device, route status information such as route freshness, number of packets forwarded with this route, packet success rate on the route.

In some embodiments of the invention, the method comprises one or several of the following steps:
- a step of forwarding the data frame with a transmission power ensuring coverage of twice the range of the end device.
- a step of, prior to forwarding the data frame, of the router device performing routing path discovery procedure for the destination device. In this case, the forwarding of the data frame results, in one example, in establishment of the routing path to the destination device.

In an exemplary embodiment, forwarded data frame contains also route discovery information and is propagated in the network according to the route discovery mechanism.

Another aspect of the invention relates to a router device comprising :
- reception means for receiving data frame from an end device in a wireless network,
- transmission means for forwarding the data frame towards a destination device in the network,
- a timer for setting out a delay before transmission of a data frame,
- means for canceling a scheduled transmission of a data frame when listening that the data frame has been transmitted by another router device,
- memory means for storing pre-established routes.

Yet another aspect of the invention relates to a network comprising at least one resource-restricted device and at least one router according to the invention.

BRIEF DESCRIPTION OF THE DRAWINGS

The present invention will now be described in more detail, by way of example, with reference to the accompanying drawings, wherein:
FIG. 1 shows a network according to the invention

DETAILED DESCRIPTION OF THE INVENTION

The present invention relates to a method of communicating in a wireless control network as shown in FIG. 1. The network comprises an end device. This device is, for example a Zigbee Batteryless Device (ZBLD), but the invention finds application with any resource-constrained wireless device, especially battery-powered or energy-harvesting devices, such as light switches, light dimmers, wireless remote controllers, movement detectors, or light detectors. The network also comprises several router devices (R1, R2, R3, R4, R5). These router devices are, in an exemplary embodiment, compliant with Zigbee communication protocols. In another advantageous embodiment, the ZigBee Batteryless Device and the routers are compliant with a lightweight 802.15.4-based ZigBee Batteryless protocol.

In a network according to the invention, the router devices are not configured in advance so as to be linked to a particular Zigbee device. Actually, the routers decide among themselves on the proxy role on the fly in an ad-hoc manner each time a data frame has to be transmitted.

A communication in the network is initiated by the ZBLD. For example, a user interaction with the ZBLD, a ZBLD-implemented sensor event or an internal timer may trigger transmission of a data frame by the ZBLD. This frame is, in an exemplary 802.15.4/ZigBee embodiment, transmitted through the MAC layer by using MAC broadcast or indirect communication. In another embodiment, still in 802.15.4/ZigBee network, the frame is transmitted through application support sub-layer by using the appropriate addressing, i.e. unicast for contacting single device, multicast for contacting a group of devices or broadcast for contacting all devices. The knowledge about the final destination of the ZBLD's packet may be stored in the ZBLD and included in the packet sent by the ZBLD, or handled by the proxy router and thus added when forwarding the frame.

All routers R1, R2, R3, R4 and R5 situated in the neighbourhood of the ZBLD thus receive the frame, or packet P. In an optional embodiment, the routers check whether this packet actually comes from a ZBLD. This can be achieved for example by including device type information in the packet, e.g. in form of a flag, identifier from within a pre-defined address pool or the used frame format. Then each router schedules forwarding of the packet after a predetermined delay. This delay corresponds, for example, to a time window in a broadcast protocol method.

In an example, the delay associated with the data frame is determined in a random manner. However, in some cases, it may be useful to adapt the random delay in view of different parameters of the network and the router devices. Indeed, in case the ZBLD data frame is to be forwarded to a unicast destination, it may be necessary that the router devices in the neighbourhood of the ZBLD discover and maintain pre-established routes to the destinations. In such a case, information regarding the total link cost of transmission to the destination can used to adapt the random delay.

In an exemplary embodiment, the random delay is calculated as:
Delay=5 ms*total_path_cost+random(0.10*nwkMaxBroadcastJitter), where total _path_cost is the total path cost from a given router to the destination of the ZBLD message, and nwkMaxBroadcastJitter is the maximal value of a broadcast jitter in a network according to the invention.

In an advantageous embodiment, each router comprises a routing table, which includes a field for memorizing the total link cost for each destination. Moreover, in some embodiments, the routing table also includes some fields related to the route status, such as freshness of the route, or its success rate, and the content of these fields can also be used for determining the delay before forwarding a data frame.

On another side, some networks according to the invention support ZBLD and/or proxy mobility. In this case, one cannot always rely on neighbourhood routers having pre-established routes to a required destination, since those routers or the ZBLD may have moved in the network since the previous transmissions. Accordingly, in an alternative embodiment, it is useful to take into account the possible mobility of the router or ZBLD devices when determining the delay associated with forwarding a data frame. The location change can be detected by, for example, neighbourhood monitoring, for example tracking the packets of neighbouring devices. Those packets may be data packets or command packets, such as heartbeat, link status messages, or association/joining/commissioning commands.

Indeed, if a router has moved itself in the network into the neighbourhood of a new ZBLD, other routers situated in the vicinity of that ZBLD are likely to have already established the routes required by the ZBLD, thus it is more efficient to carry out a feature that allows prioritizing those routers over the one having recently moved. In this view, the router that has recently moved sets the path-cost dependent value of the forwarding delay to the maximum possible value, and thus forwards the message on behalf of the ZBLD only if none other routers have done it.

Conversely, if it is the ZBLD that moved inside a network into a new vicinity, it is quite likely that none of the neighbouring routers has a route to the ZBLD's destination, so routing path will have to be established anyway. Thus, there is no point in delaying the new proxy assignment. In such a case, the router sets the path-cost dependent value of the forwarding delay to the minimum possible value.

Thus, each router R1, R2, R3, R4 or R5 schedules transmission of the data packet P after a random delay. Let's assume that router R5 is the one having associated the shortest delay. Then, at a timeout, router R5 transmits the packet ($P_{FW}$) with a power high enough for ensuring coverage of twice the usual range covered by the ZBLD. Other routers of the neighbourhood, namely R1, R2, R3 and R4 will thus receive packet $P_{FW}$ forwarded by router R5, and thus they cancel their scheduled transmission, to avoid any double transmission of the data frame.

As explained before, in some cases, the router devices in a network perform ad-hoc route discovery on behalf of the ZBLD. Such discovery is made, for example, by sending a route request message after receiving a data packet from the ZBLD. This solution has the drawback of inducing an additional delay in transmission, since the data frame originated by the ZBLD is forwarded only after the route is in place. To avoid this drawback, in an alternative embodiment, the proxy router sends the data frame, extended by route request field. The total message sent by the proxy router has an extended header, containing the required route discovery information. The message is sent using a broadcast method, and results in the establishment of the routing path between the proxy router and the ZBLD's target device.

The invention finds a particular advantageous application with batteryless devices for control networks, esp. lighting control networks, building automation and home automation. Examples of devices include light switch, light remote control, light dimmer, light sensor, and presence detector.

It may also find applications with battery-powered devices in control networks (e.g. ZigBee EndDevices, ZEDS) with limited energy storage, to further optimize their operation and increase their lifetime.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of wireless control networks and which may be used instead of or in addition to features already described herein.

The invention claimed is:

1. A method for wireless communication in a network comprising a resource-restricted end device, and at least one router device, the method comprising:
    transmitting, by the end device, a data frame to be forwarded to a destination device in the network,
    receiving, by the router device, the data frame from the end device,
    the router device associating a delay to the data frame and scheduling transmission of the data frame after this delay, and
    when the router device receives the data frame from another router device, cancelling the scheduled transmission of the data frame in order to avoid a duplicate transmission of the data frame,
    wherein the delay is determined in a range having a maximum value and a minimum value,
    the method further comprising:
        checking whether the router device has a pre-established route to the destination device, and
        setting up the delay as the maximum value in the range when the router device does not have a pre-established route.

2. A method as recited in claim 1, wherein the delay is determined at least partly in a random manner.

3. A method as recited in claim 1, further comprising determining the delay associated to the forwarding of the data frame by taking into account the total path cost of the transmission to the destination device.

4. A method as recited in claim 1, further comprising determining the delay associated to the forwarding of the data frame by taking into account route status information.

5. A method as recited claim 1, further comprising determining the delay associated to the forwarding of the data frame in case of non-existing route, by further taking into account possible router or end-device location change.

6. A method as recited in claim 1, further comprising forwarding the data frame with a transmission power ensuring coverage of twice the range of the end device.

7. A method as recited in claim 1, further comprising, prior to forwarding the data frame, the router device performing routing path discovery procedure for the destination device.

8. A method as recited in claim 1, wherein the forwarding of the data frame results in establishment of the routing path to the destination device.

9. A method as recited in claim 1, wherein forwarded data frame contains also route discovery information and is propagated in the network according to the route discovery mechanism.

10. A router device, comprising:
    a receiver configured to receive a data frame from an end device in a wireless network;
    a transmitter configured to forward the data frame towards a destination device in the network;
    a timer configured to set out a delay before transmission of the data frame;

a processor configured to cancel a scheduled transmission of the data frame when receiving the data frame from another router device in order to avoid a duplicate transmission of the data frame; and a memory device configured to store pre-established routes;

wherein the timer is configured to set the delay in a range having a maximum value and a minimum value;

wherein the processor is further configured to check whether the memory device stores a pre-established route to the destination device; and wherein the timer is configured to set up the delay as the maximum value in the range when the memory device does not store the pre-established route to the destination device.

11. A wireless network comprising at least one resource-restricted device and at least one router, wherein the at least one router comprises:

a receiver configured to receive a data frame from an end device in a wireless network;

a transmitter configured to forward the data frame towards a destination device in the network;

a timer configured to set out a delay before transmission of the data frame;

a processor configured to cancel a scheduled transmission of the data frame when receiving the data frame from another router device in order to avoid a duplicate transmission of the data frame; and a memory device configured to store pre-established routes;

wherein the timer is configured to set the delay in a range having a maximum value and a minimum value;

wherein the processor is further configured to check whether the memory device stores a pre-established route to the destination device; and wherein the timer is configured to set up the delay as the maximum value in the range when the memory device does not store the pre-established route to the destination device.

* * * * *